Figure 1:
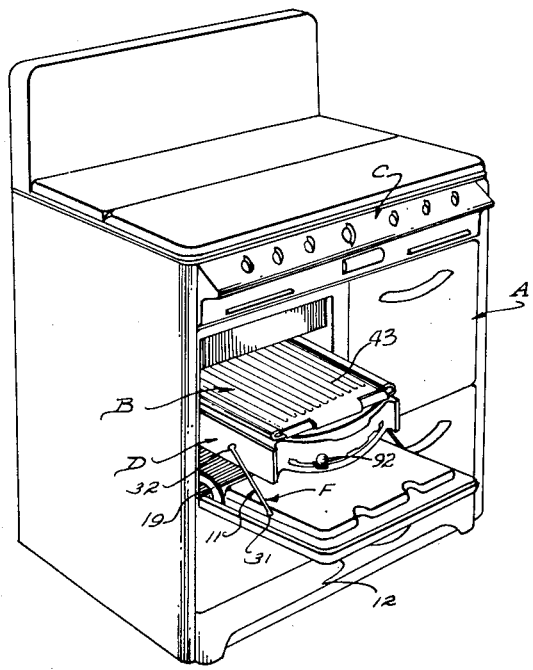

Jan. 5, 1954 W. G. DURANT 2,664,878
ADJUSTABLE BROILER FOR COOK STOVES
Filed Oct. 28, 1949 3 Sheets-Sheet 1

INVENTOR.
Wilbur G. Durant
BY
Attorney

Jan. 5, 1954  W. G. DURANT  2,664,878
ADJUSTABLE BROILER FOR COOK STOVES
Filed Oct. 28, 1949  3 Sheets-Sheet 2
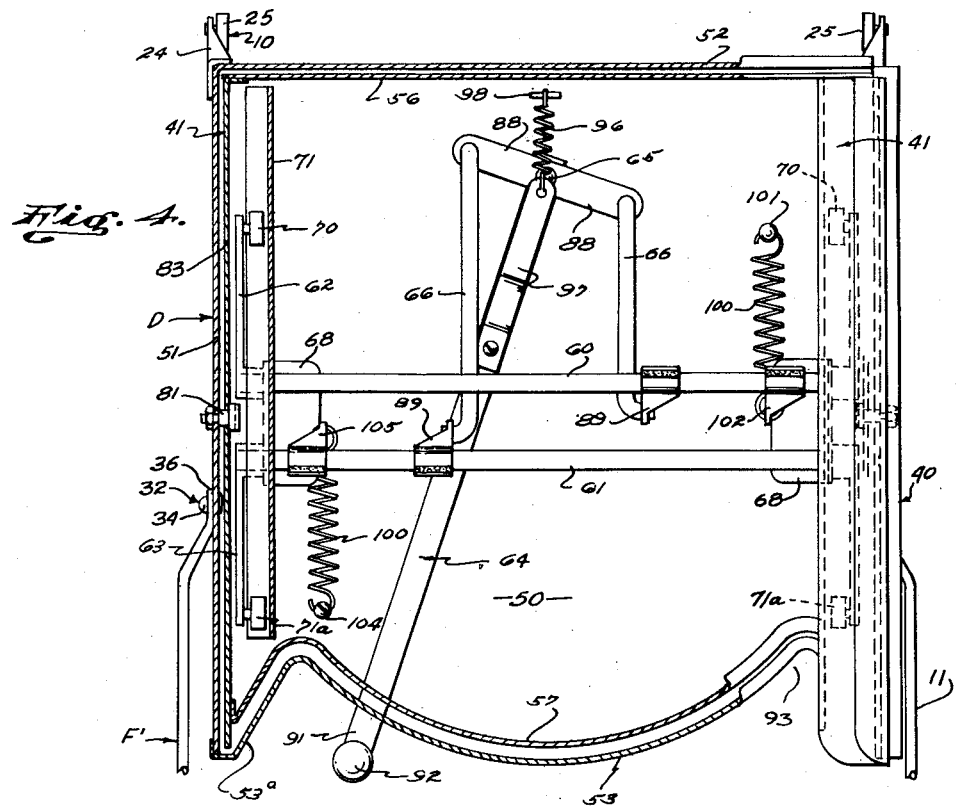
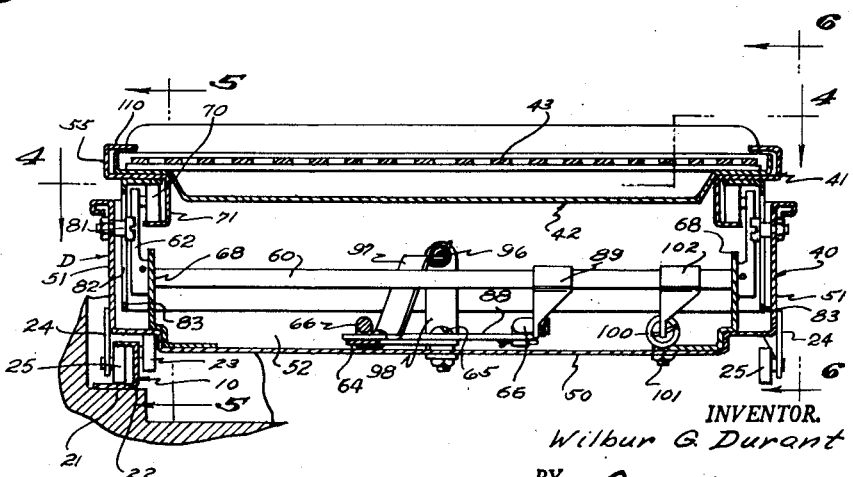
INVENTOR.
Wilbur G. Durant
BY
Attorney

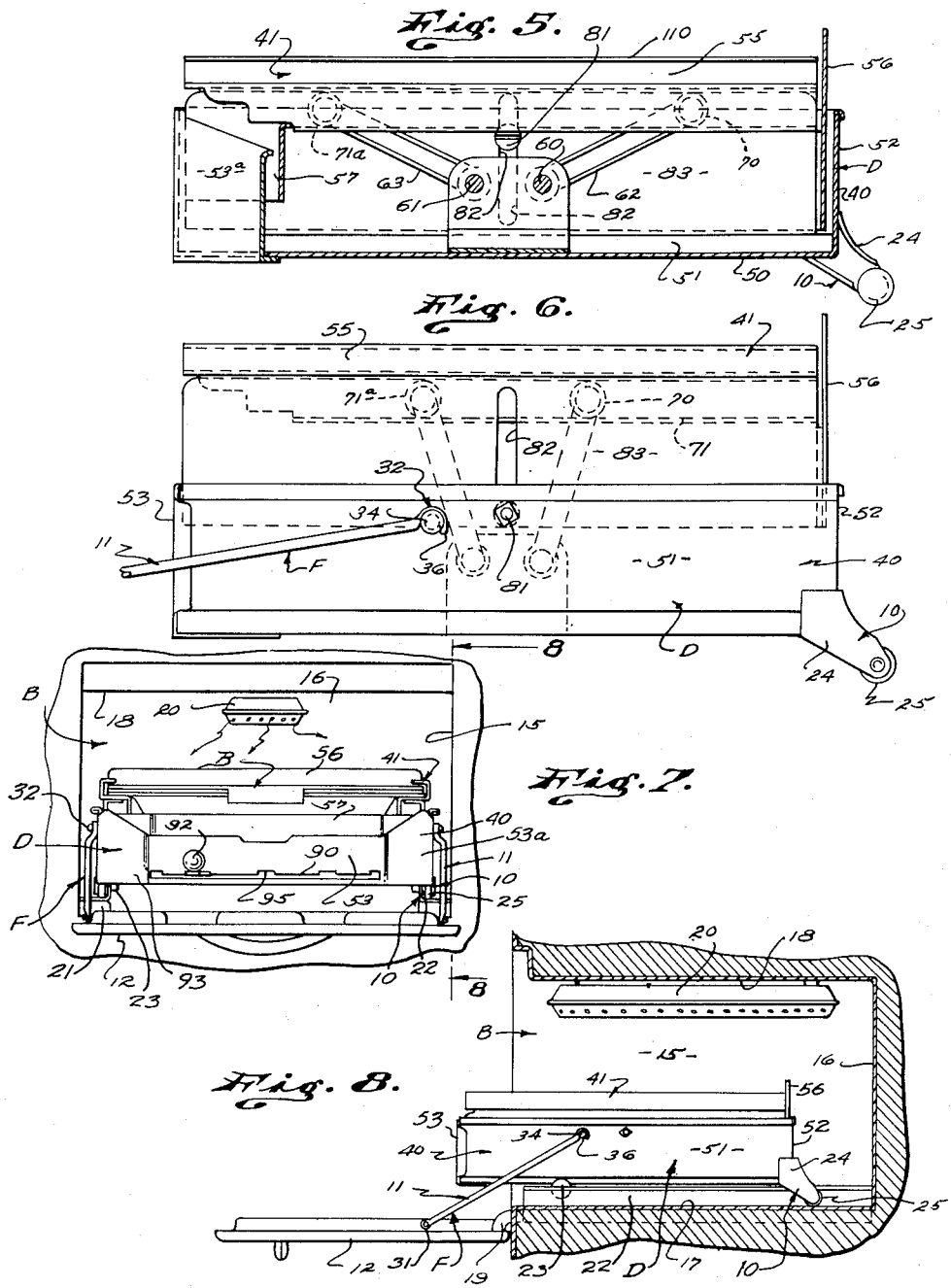

Patented Jan. 5, 1954

2,664,878

UNITED STATES PATENT OFFICE 2,664,878

ADJUSTABLE BROILER FOR COOK STOVES

Wilbur G. Durant, Pasadena, Calif., assignor to O'Keefe & Merritt Company, Los Angeles, Calif., a corporation of California Application October 28, 1949, Serial No. 124,189

6 Claims. (Cl. 126—41)

This invention has to do with an adjustable broiler for a cook stove and it is primarily concerned with the construction of the grid carrier and the operating means therefor and with the coordination of the grid carrier and the door of the stove compartment. A general object of the invention is to provide various simplified improved and practical features of stove construction concerned with those portions of the stove above set forth.

The present invention is practical as applied to a cook stove designed primarily for domestic or home use. The form of the invention illustrated is suitable for an ordinary or conventional cooking range or stove provided with a compartment commonly termed a grill compartment and that compartment is provided with a hinged closure having its lower edge secured or anchored by hinge means so that it swings down and out between a closed position and an open position. Horizontal guides are provided in the compartment at the lower side corners thereof and the grid carrier operates in the grill compartment and is supported therein through suitable mounting means preferably involving front rollers carried by guides in the compartment and rear rollers carried by brackets on the carrier and engaged in the guides. Coupling means connect or link the door of the grill compartment with the grid carrier so that these parts operate in synchronism.

The grid carrier involves, generally, a base which is an upwardly opening box-like structure, and a head which moves vertically relative to the base and which is preferably a rectangular frame-like structure. Mounting means supports the head in or from the base and is operable to shift the head vertically relative to the base. The mounting means involves spaced shafts extending transversely of the grid carrier and located in a horizontal plane, which shafts have arms which engage the head. An operating lever is pivoted to the base and projects forward therefrom through an arcuate vertically disposed front wall and is operatively coupled with the shafts to rotate them simultaneously in opposite directions. The operating lever has a cross arm intersecting the pivotal axis of the lever and links are pivoted to the ends of the cross arm and connect to arms fixed on the shafts. Counterbalancing means acts to normally yieldingly urge the mechanism just described in a manner to elevate the head. In the preferred arrangement the counterbalancing means involves one or more tension springs anchored to the base and connected to arms projecting from shafts, the parts being connected and related so that the springs counterbalance the weight of the head and parts carried thereby and a normal load supported by the structure. The head carries a pan and the grid is supported above the pan.

It is a general object of the present invention to provide a grid carrier for use in a grill compartment, or the like, of a stove, which carrier involves a base shifting horizontally and a head shifting vertically relative to the base and a simple, effective, easily operated means actuating the head relative to the base.

Another object of the invention is to provide a grid carrier of the general character referred to in which the front of the structure is vertically disposed and is arcuate and has an operating lever projecting therefrom to move transversely of the structure, for operation of the head relative to the base.

Another object of the invention is to provide a carrier of the general character referred to including counterbalancing means acting to counterbalance the weight of the parts that move vertically and also a normal load carried by the structure.

Figure 2:
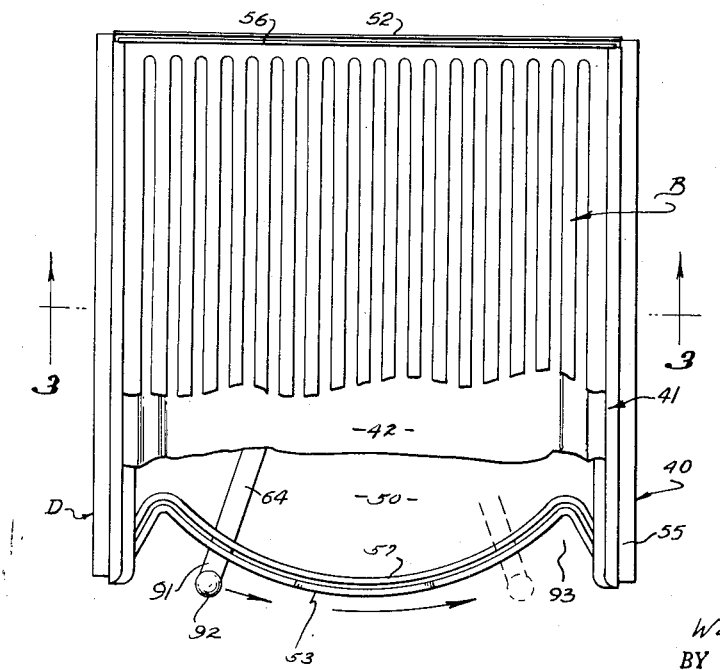

The various objects and features of my invention will be fully understood from the following detailed description of a typical preferred form and application of my invention, throughout which description reference is made to the accompanying drawings, in which:

Fig. 1 is a perspective view of a stove embodying the present invention showing the closure or door of the grill compartment open and the grid carrier provided by the present invention extended to project forward and somewhat out of the grill compartment. Fig. 2 is a plan view of the grid carrier shown apart from the other elements of the structure and with certain portions broken away to illustrate the details of construction. Fig. 3 is an enlarged detailed transverse sectional view of the structure shown in Fig. 2, being a view taken as indicated by line 3—3 on Fig. 2. Fig. 4 is a plan section taken as indicated by line 4—4 on Fig. 3. Fig. 5 is a longitudinal sectional view taken as indicated by line 5—5 on Fig. 3, showing the parts in one position. Fig. 6 is a view similar to Fig. 5 showing the parts in another position and being a view taken as indicated by line 6—6 on Fig. 3. Fig. 7 is a front elevation of the structure taken at the front of the open grill compartment as shown in Fig. 1, and Fig. 8 is a sectional view taken substantially as indicated by line 8—8 on Fig. 7.

The stove illustrated in the drawings and to which the present invention is applied is of a type designed primarily for domestic or home use, and typical of this type of structure, it may involve suitable frame members, panels, and other structural elements serving to define features such as an oven at A, a grill compartment at B, a control panel at C, etc.

The structure provided by this invention is applicable to a stove compartment such as a broiler compartment and in the drawings it is illustrated in or as applied to the broiler compartment B of the stove. The present invention provides, generally, a grid carrier D mounted in the broiler compartment B through means 10 to shift horizontally between and out or extended position, such as is shown in Fig. 1, and an in or operating position where it is entirely within the compartment. The invention further provides coupling means F connecting the grid carrier D and the door 12 of the compartment so that the door and carrier operate in synchronism.

In the particular case illustrated in the drawings the broiler compartment of the stove has spaced vertical side walls 15, a back 16, a bottom 17 and a top 18. The front or closure 12 of the compartment has its lower edge portion pivotally held by suitable hinges 19 so that it operates between an up or closed position where it closes the compartment and a down or open position where it extends horizontally and forms in effect a continuation of the bottom 17 of the compartment. In conformance with usual stove construction a burner 20 is located in the compartment B immediately beneath the top 18.

The mounting means 10 provided for supporting the grid carrier D in the compartment B may vary widely in form and construction. In the particular case illustrated suitable raised parts or ledges 21 are provided at the edge portions of the bottom 17 which join to the sides 15 and outwardly faced U-shaped guides 22 are mounted on the ledges. Carrier supporting rollers 23 are mounted on the forward end portions of the guides 22 to engage under the carrier and brackets 24 depend from the rear end portion of the carrier and support rollers 25 which operate in the guides 22. Through this construction the carrier D is supported in the lower portion of the compartment B to operate horizontally between an in position where it is entirely within the compartment and an extended or out position where it projects somewhat forward from the compartment.

The coupling means F connects the door 12 of the compartment B and the grid carrier D so that as the door is operated or swung the carrier is slid or shifted horizontally. The means F involves one or more links 11 connecting the door 12 and carrier D. In the form of the invention illustrated there are two links 11, one at each side of the grid carrier D. Each link has one end pivoted to the door 12 as at 31 while its other end is pivoted to the side of the carrier D at 32. It is preferred that one of the pivotal connections of each link 11 be releasable so that the grid carrier can be detached from the door for complete removal from the compartment B when desired. In the case illustrated the releasable connection is provided between each link 11 and the grid carrier and the construction shown involves a headed pin 34 on the side of the carrier and a hook 36 on the end of the link having hooked pivotal engagement with the pin 34. From the drawings it will be apparent how the parts just described are proportioned and related so that as the door is opened the carrier D slides or shifts forward to an extended position, as shown in Fig. 1, and operates in the reverse manner when the door is closed.

The carrier D involves, generally, a base 40 which is the part supported in the compartment B through the means 10 to shift horizontally, as above described, a head 41 carried by the base 40 to be shiftable vertically relative thereto, a pan 42 carried by the head, and a grid 43 mounted above the pan. The structure further provides mounting means between the base 40 and head 41 supporting the head from the base and operable so that the head is shifted relative to the base.

In the form of the invention illustrated the base 40 is a sheet metal unit in the nature of an upwardly opening box having a bottom 50, vertical sides 51, a back 52 and a vertically disposed front 53. In the particular case illustrated the bottom 50 is a flat horizontally disposed part preferably dropped somewhat between the parts that are engaged with the supporting rollers 23 to provide space for mechanism hereinafter described.

The head 41 is a frame-like unit preferably engageable in the base from the open upper end or top thereof. In the preferred form of the invention the head 41 is a substantially rectangular frame-like structure involving side members 55, a transversely disposed back 56 extending between the rear ends of the side members 55, and a vertically disposed front 57 that extends between the forward or front ends of the sides 55. The front 57 is located immediately within and overlaps the front 53.

The mounting means or mechanism by which the head 41 is supported in or from the base 40 involves two shafts 60 and 61 rotatably supported in the base, elevating or lift arms 62 and 63 projecting from the shafts 60 and 61, respectively, and engaged with the head 41, an operating lever 64 mounted in the base 40 by means of a pivot 65, and links 66 connecting the operating lever and the shafts.

The shafts 60 and 61 extend transversely of the structure within the base 40 and they are arranged parallel with each other in a horizontal plane so that the shaft 60 is located rearward of the shaft 61. In the case illustrated upstanding brackets 68 are provided in the base 40 at the edge portions and rotatably support the end portions of the shafts 60 and 61.

The arms 62 are fixed on the ends of shaft 60 between the brackets 68 and the sides 51 of the base and they project upwardly and rearwardly. The outer ends of arms 62 carry rollers 70 which are engaged in channel-shaped guides 71 forming parts of the side members 55 of head 41. The arms 63 are fixed on the ends of shaft 61 between the brackets 68 and the sides 51 of the base and project upward and forward from the shaft. Rollers 71ᵃ on the outer ends of the arms 63 are engaged in the channel-shaped guides 71. The arms 62 and 63 on the shafts 60 and 61, respectively, are of equal lengths with the result that they support the head 41 in a horizontal plane, and from the drawings, particularly Figs. 5 and 6 of the drawings, it will be apparent that by synchronously rotating the shafts 60 and 61 in opposite directions the arms 62 and 63 are swung oppositely and in like manner, causing the head 41 to move vertically relative to the base. The parts are arranged and related so that the head can be moved between a down or collapsed position such as is shown in Fig. 5 and an up or elevated position such as is shown in Fig. 6.

In the preferred form of the invention a guide means is provided so that the head 41 operates vertically relative to the base 40. In the case illustrated the vertical guide means involves guide pins 81 projecting inwardly from the sides 51 of the base to engage in vertical guide slots 82 in the depending portions 83 of the side members of the head.

The operating lever 64 is located immediately above the bottom 50 of the base 40 and the pivot member 65 that carries the lever 64 is centrally located in the base a short distance forward of the back thereof. The lever 64 is loosely pivotally carried by the pivot member 65 to swing horizontally between positions such as are indicated in Fig. 2 of the drawings. The links 66 which connect the operating lever 64 with the shafts 60 and 61 are pivotally connected to the outer ends of a cross arm 88 provided on the lever 64 and intersecting the pivot member 65. The links 66 are pivotally connected to operating arms 89 which are fixed on the shafts 60 and 61. Through this construction the arms 62 and 63 supporting the head 41 are in a down position when the operating lever 64 is to the left, as shown in Figs. 1, 2, and 4 of the drawings, or are up or elevated when the lever 64 is moved to the right, as shown in dotted lines in Fig. 2. It will be apparent that by stopping the lever 64 in an intermediate position the arms 62 and 63 may be stopped in an intermediate position.

The operating lever 64 projects through a horizontal slot 90 in the vertical front 53 of the base 40 so that it has a forward end portion 91 projecting forward from the base, which portion of the lever preferably carries an operating knob or handle 92. In accordance with the preferred form of the invention the front 53 of the base 40 which is slotted to pass the operating lever has an arcuate or forwardly curved central portion to be substantially concentric with the pivotal axis of the lever. End portions 53ª of the front 53 connect to and extend outward and forward from the ends of the curved or arcuate part and connect with the forward ends of the sides of the base to establish recesses or pockets at 93 receiving the projecting portion 91 of the lever and the handle 92 thereon when the lever is in the extreme positions.

It is preferred that means be provided for latching the mechanism in various set or adjusted positions, and in the form of the invention illustrated the desired latching action is provided by establishing notches 95 in one edge of the slot 90, say for instance, the upper edge, and by providing a spring 96 acting on the lever 64 to normally yieldingly urge it in a manner to bear on the notched edge or into one of the knobs 95. In the case illustrated a lug 97 projects from the lever and the spring 96 is connected between the lug 97 and a lug 98 which projects up from the bottom 50 of the base. The spring 96 is a tension spring and when connected, as shown in Figs. 3 and 4 of the drawings, it normally yieldingly tends to lift the outer or handle end of the lever 64 and thus holds it in engagement with the notched edge or slot 90.

The invention provides counterbalancing means acting to counterbalance the weight of the head 41 and the parts connected thereto or carried thereby, and it is also preferred that the counterbalancing means be such as to counterbalance a portion, at least, of a normal load that may be applied to the structure. In the case illustrated the counterbalancing means involves one or more tension springs 100 suitably coupled with working parts of the mechanism. In the case illustrated there are two tension springs 100. One tension spring is anchored to the base 40 at 101 and connects to an arm 102 depending from shaft 60 while the other tension spring 100 is anchored to the base at 104 and connects to an arm 105 depending from shaft 61. The tension springs are such as to be extended or under tension when the head 40 is in the lowered or down position and they are so related to the arms to which they are connected as to tend to rotate the shafts 60 and 61 so that the arms 62 and 63 tend to elevate the head 41. It will be apparent that the springs 100 may in practice be of such strength and extent as to exert the desired elevating pressure so that the weight of the head 41 and other parts carried thereby or connected therewith is effectively counterbalanced and the springs may even counterbalance a part of the normal load applied to the structure.

The pan 42 is shown as a simple drip pan supported by the head 41 and guided in suitable opposed or inwardly faced guideways 110 on the side members 55 of the head. The grid 43 is shown as a simple or conventional structure of this type and it is shown arranged over or carried by the pan so that a material dripping from objects on the grid is caught in the pan. It will be understood, of course, that the pan and the grid are separately removable from the head 41 to facilitate washing or cleaning as conditions require.

From the foregoing description it will be apparent that the present invention provides an adjustable grid carrying structure that is easily operated to vary the position of the grid relative to the burner located in the broiler compartment. The structure can be easily operated or set in various positions and the various parts of the structure are simple and inexpensive of manufacture.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. In combination, a broiler defining a cooking compartment, a base mounted in the compartment to move horizontally back and forth therein and having a vertically disposed front wall with a horizontal slot therein, a rigid unitary operating lever, means pivoting the lever to the rear end portion of the base with an operating end projecting forward through the slot, said operating end of the lever being loose in the slot for horizontal and also vertical movement therein, means normally yieldingly urging the lever vertically into engagement with one horizontal edge of the slot, shafts carried by the base to extend transversely thereof substantially midway between the front and rear end portions thereof, a grid carrying frame, arms on the ends of the shafts adapted to operate the frame vertically relative to the base, means operatively connecting the shafts and lever for operation of the shafts from the lever, and counterbalancing springs normally tending to operate the shafts for upward movement of the frame, the last mentioned means including, a cross arm fixed on the lever at the pivoted portion thereof, links pivoted to the cross arm and projecting forward therefrom, and arms fixed on the shafts and depending therefrom and pivoted to the links to be operated thereby.

2. In combination, a stove broiler, a base mounted in the broiler to be movable horizontally back and forth therein, a grid carrying frame, and an operating mechanism mounting the frame from the base for adjustment vertically relative thereto including, two spaced parallel shafts with lateral projections and rotatably mounted in the base to extend transversely of the direction in which the base moves horizontally, arms on the ends of the shafts and supporting the frame, an operating lever with a cross arm and pivotally carried by the base at the innermost portion thereof to swing horizontally, links connected to the arm of the lever and extending toward the forward end of the base, arms fixed on the shafts intermediate their ends and connected to the links, and counterbalancing springs anchored to the base and attached to the projections on the shafts.

3. In combination, a stove having a broiler compartment extending into it from the front thereof, the stove having fixed parts defining the top, back and sides of the compartment and having a pivotally mounted door adapted to normally close the compartment at the front of the stove, a base operable in the compartment horizontally from a position entirely within the compartment, when the door is closed, to a position, when the door is open, where its front is forward of the compartment and overlies a portion of the door, while its back is in the compartment, a grid carrying frame with sides adjacent the sides of the compartment, and a mechanism mounting the frame from the base for vertical adjustment relative thereto including, two shafts rotatably carried by the base and extending transversely of the direction in which the base operates, lift arms on the shafts at the extremities thereof and supporting the frame at the sides adjacent the sides of the compartment, an operating arm on each shaft, a lever having a cross arm and pivoted to the base adjacent the back thereof and projecting from the front thereof, and links connected to the cross arm of the lever and to the operating arms on the shafts.

4. A stove having a broiler compartment extending into it from the front thereof, the stove having parts defining the top, back and sides of the compartment, and having a door pivoted at the front thereof and adapted to normally close the compartment at the front thereof, a base operable horizontally in the compartment from a position entirely within the compartment when the door is closed, to a position, when the door is open, where its front is forward of the compartment while its back is in the compartment, the base having a back edge adjacent the back of the compartment when the base is entirely within the compartment, a grid carrying frame, and a mechanism mounting the frame from the base for vertical adjustment relative thereto including, two shafts rotatably carried by the base and extending transversely thereof in a direction normal to that in which the base operates, lift arms on the shafts, rollers on the lift arms engaging and supporting the frame, a lever, a pivot connecting the lever to the base adjacent the back edge thereof and with a part projecting from the front thereof, a cross arm fixed on the lever at the pivotally held part thereof, operating arms on the shafts, and links connected to and operated by the cross arm and connected to and operating the operating arms.

5. In combination, a stove having parts defining a forwardly opening broiler compartment extending into it from the front thereof and having a door pivoted at the front thereof and adapted to close the compartment, a base operable horizontally in the compartment from a position entirely within the compartment where it has a back adjacent the part of the stove defining the back of the compartment and a front within the compartment adjacent the door when the door is closed to a position where its front is forward of the compartment and overlies the door when the door is open while its back is in the compartment, a grid carrying frame with sides adjacent the sides of the compartment, and a mechanism mounting the frame from the base for vertical adjustment relative thereto including, two shafts rotatably carried by the base and extending transversely thereof in a direction normal to that in which the base operates, lift arms fixed on the ends of the shafts and extending in substantially opposite directions from the shafts and engaging and supporting the frame at said sides thereof, a lever extending from the back portion of the base to the front thereof, a pivot connecting the lever to the base adjacent the back thereof and with a part projecting from the front thereof, a cross arm fixed on the lever at the pivoted end thereof with ends projecting in opposite directions from the lever, operating arms fixed to and depending from the shafts, and links pivotally connected to said ends of the cross arm and pivotally connected to the lower ends of the operating arms.

6. In a stove having an elongate broiler compartment extending horizontally into the stove from the front thereof, said compartment being open at the front of the stove, a door pivotally carried by the stove at the front thereof and adapted to close the compartment, an elongate base operable horizontally lengthwise in the compartment from a position, when the door is closed, entirely within the compartment to a position, when the door is open, where its front is forward of the compartment while its back is in the compartment, a grid carrying frame above the base with sides extending in the direction in which the base operates, and a mechanism mounting the frame from the base for vertical adjustment relative thereto including, two shafts rotatably carried by the base and extending transversely thereof substantially midway between the ends thereof and with the shafts extending in a direction normal to that in which the base operates, lift arms on the ends of the shafts, rollers on the lift arms engaging and supporting the frame, a lever, a pivot connecting the lever to the base adjacent the innermost end thereof and with a part projecting from the front thereof, a cross arm on the lever extending transversely thereof and intersecting the axis of said pivot and having ends projecting in opposite directions from the lever, operating arms fixed to and depending from the shafts, and links pivotally connected to said ends of the cross arm and pivotally connected to the lower ends of the operating arms.

WILBUR G. DURANT.

References Cited in the file of this patent

UNITED STATES PATENTS

| Number | Name | Date |
| --- | --- | --- |
| 1,808,357 | Kole | June 2, 1931 |
| 1,811,428 | Dribble | June 23, 1931 |
| 1,941,541 | Dibble | Jan. 2, 1934 |
| 2,127,146 | Smallen | Aug. 16, 1938 |
| 2,135,309 | Leonard | Nov. 1, 1938 |
| 2,263,473 | Rogers | Nov. 18, 1941 |
| 2,339,422 | Phares | Jan. 18, 1944 |